United States Patent
Markham et al.

(10) Patent No.: US 8,794,036 B2
(45) Date of Patent: Aug. 5, 2014

(54) APPARATUS AND METHOD FOR SEPARATING A GLASS SHEET FROM A MOVING RIBBON OF GLASS

(75) Inventors: Shawn R. Markham, Harrodsburg, KY (US); Jae H. Yu, Lexington, KY (US)

(73) Assignee: Corning Incorporated, Corning, NY (US)

(*) Notice: Subject to any disclaimer, the term of this patent is extended or adjusted under 35 U.S.C. 154(b) by 248 days.

(21) Appl. No.: 13/303,732

(22) Filed: Nov. 23, 2011

(65) Prior Publication Data

US 2013/0047674 A1 Feb. 28, 2013

Related U.S. Application Data

(60) Provisional application No. 61/526,367, filed on Aug. 23, 2011.

(51) Int. Cl.
*C03B 21/00* (2006.01)

(52) U.S. Cl.
CPC ........................................ *C03B 21/00* (2013.01)
USPC .................................................. 65/97; 65/91

(58) Field of Classification Search
CPC .. C03B 17/064; C03B 17/06; C03B 33/0215; C03B 25/08; C03B 29/08; C03B 21/00
USPC ............................................ 65/90–94, 97–98
See application file for complete search history.

(56) References Cited

U.S. PATENT DOCUMENTS

| | | | | |
|---|---|---|---|---|
| 1,565,307 | A * | 12/1925 | Blair | 65/44 |
| 3,149,949 | A * | 9/1964 | Dockerty et al. | 65/53 |
| 6,616,025 | B1 * | 9/2003 | Andrewlavage, Jr. | 225/96.5 |
| 7,735,338 | B2 * | 6/2010 | Mueller et al. | 65/29.14 |
| 7,984,625 | B2 * | 7/2011 | Markham et al. | 65/29.12 |
| 2004/0065115 | A1 * | 4/2004 | Mueller et al. | 65/29.17 |
| 2006/0042314 | A1 * | 3/2006 | Abbott et al. | 65/25.3 |
| 2007/0095108 | A1 * | 5/2007 | Kirby et al. | 65/475 |
| 2008/0066498 | A1 * | 3/2008 | Markham et al. | 65/29.16 |
| 2008/0202165 | A1 * | 8/2008 | Hoysan et al. | 65/90 |
| 2009/0092472 | A1 * | 4/2009 | Luo et al. | 414/752.1 |
| 2009/0107182 | A1 * | 4/2009 | Anderson et al. | 65/90 |
| 2010/0043495 | A1 * | 2/2010 | Kirby et al. | 65/91 |
| 2010/0162763 | A1 * | 7/2010 | Pitbladdo | 65/90 |
| 2010/0258993 | A1 * | 10/2010 | Zhou et al. | 269/20 |

* cited by examiner

*Primary Examiner* — Jodi C Franklin
(74) *Attorney, Agent, or Firm* — Kevin M. Able

(57) ABSTRACT

Disclosed are methods for compensating the varying weight of a glass ribbon the glass ribbon is drawn from a molten glass forming material, and an apparatus therefore. The weight compensating apparatus is configured to apply a force to the glass ribbon that is inversely proportional to the weight of the glass ribbon such that as the glass ribbon weight increases, the force applied to the glass ribbon by the weight compensating device decreases.

20 Claims, 7 Drawing Sheets

APPARATUS AND METHOD FOR SEPARATING A GLASS SHEET FROM A MOVING RIBBON OF GLASS

CROSS-REFERENCE TO RELATED APPLICATIONS

This application claims the benefit of priority under 35 U.S.C. §119 of U.S. Provisional Application Ser. No. 61/526,367 filed on Aug. 23, 2011, the content of which is hereby incorporated by reference.

BACKGROUND

1. Field

The present invention relates to a method of cutting or separating a sheet of glass from a moving ribbon of glass, and in particular, ensuring a stable orientation of the ribbon during the separating cycle by compensating for a varying weight of the glass ribbon.

2. Technical Background

Down draw processes like the fusion-draw process produce a continuous ribbon of glass that transitions from a viscous glass-forming material to an elastic solid as the glass descends from a forming body. As the length of the glass ribbon grows, a point is reached when a cutting apparatus cuts (separates) a glass sheet from the ribbon, thereby shortening the ribbon by the length of the glass sheet. In addition to shortening the ribbon, the weight of the ribbon decreases by the weight of the separated glass sheet.

In a typical downdraw process used to produce glass sheets used in the manufacture of display panels, it is important to minimize contact between portions of the ribbon that will form a part of the subsequent display panel, the so-called quality area of the ribbon. Consequently, contact is sparing, and performed typically only at the edges of the ribbon, which are later removed. Therefore, the glass ribbon is only moderately constrained by the drawing apparatus. More particularly, the free end of the ribbon, from which the glass sheet is removed, is freely hanging from upstream supports when not engaged by the cutting apparatus. When a glass sheet is cut from the free end of the ribbon, the sudden reduction in weight that occurs when the glass sheet is removed can cause the newly formed free end to spring into a new shape. This sudden change in shape can be propagated upstream through the ribbon and perturb the drawing process. For example, the pulling force on the ribbon produced by upstream pulling rolls can be disrupted, and stresses can be induced into the glass ribbon as the glass ribbon transitions from a viscous liquid to a solid as it passes through the glass transition temperature range. A method and apparatus that compensates for the change in weight of the ribbon would minimize or eliminate this source of process inconsistency.

SUMMARY OF THE INVENTION

As a continuously moving glass ribbon, e.g. a glass ribbon formed by the continuous down draw of molten glass from a reservoir, the shape of the glass ribbon varies with time. That is, as the glass ribbon grows longer, the weight of the glass ribbon increases. Consequently, the glass ribbon tends to flatten longitudinally over time, until a glass sheet is removed from the glass ribbon. Since a portion of the glass ribbon hangs freely, when the glass sheet is removed from the glass ribbon, the weight of the glass sheet is also removed, and the forces that tended to longitudinally flatten the glass ribbon are suddenly reduced or eliminated. The resultant movement of the glass ribbon may induce perturbations into the glass ribbon that disrupt portions of the glass ribbon upstream of the where the glass sheet from removed from the ribbon. For example, these perturbations may negatively influence the glass ribbon in that portion of the glass ribbon where the ribbon transforms from a viscous liquid to an elastic solid. One potential effect can be the freezing in of stresses. Other effects include disruptions to the drawing forces applied to the glass ribbon.

In accordance with embodiments described herein below, apparatus and methods are described wherein the foregoing variation in ribbon weight over time is compensated for by a weight compensating apparatus.

In one embodiment a method of forming a glass sheet is disclosed comprising flowing molten glass from a forming body in a downdraw process to form a continuously moving glass ribbon having a length and a free end, and wherein the length of the glass ribbon varies as a function of time, engaging the continuously moving glass ribbon with a first weight compensating apparatus, applying a downward force to the continuously moving glass ribbon with the first weight compensating apparatus, wherein the force applied by the first weight compensating apparatus is inversely proportional in magnitude to the length of the glass ribbon such that as the length of the glass ribbon increases, the force applied by the weight compensating device decreases. A score may then be formed in the continuously moving glass ribbon and a portion of the continuously moving glass ribbon separated at the score to form a glass sheet. The preceding steps may then be repeated to form a subsequent glass sheet, wherein the weight compensating apparatus continues in a reciprocating fashion to engage the glass ribbon and apply a downward force to the glass ribbon, disengage from the glass ribbon, move upward to a home position and re-engage the glass ribbon to begin another cycle.

The embodiment may further comprise engaging the continuously moving glass ribbon with a traveling anvil machine, wherein the traveling anvil machine comprises a scoring device and a backing bar. Preferably, the traveling anvil machine does not apply a downward force to the continuously moving glass ribbon. Additionally, the method may also include engaging the glass ribbon with a robot below the score, wherein the robot bends the glass ribbon across the score to produce a crack that separate a glass sheet from the continuously moving glass ribbon.

Preferably, the first weight compensating apparatus engages with a first edge portion of the continuously moving glass ribbon, thereby avoiding the interior quality area of the glass ribbon. The quality area is the area of the glass ribbon that continues through the glass making process and is useable in subsequent final products such as display panels, lighting panels and the like. The edge portions of the glass ribbon are typically cut away and discarded, or used as cullet in the glass making process.

In certain embodiments the continuously moving glass ribbon is engaged with a second weight compensating apparatus. The second weight compensating apparatus preferably engages the glass ribbon on a second edge portion. In some embodiments the second weight compensating apparatus is controlled independently from the first weight compensating apparatus such that a downward force applied to the glass ribbon by the second weight compensating apparatus is different than the force applied by the first weight compensating apparatus.

In another embodiment, a method of forming a glass sheet is described comprising flowing molten glass from a forming body in a downdraw process to form a continuously moving glass ribbon having a free end, the glass ribbon traveling with a velocity vector V and comprising a time varying free weight, engaging the glass ribbon with a first weight compensating apparatus, wherein the first weight compensating apparatus applies a first force to the glass ribbon that is inversely proportional in magnitude to the free weight; scoring the glass ribbon; and separating a glass sheet from the glass ribbon. The separating step may comprise, for example, applying a bending force to the glass ribbon with a robot engaged with the glass ribbon. In some embodiments, the method may further comprise engaging the glass ribbon with a backing bar, the backing bar traveling at a velocity vector that equal the velocity vector V of the glass ribbon.

Preferably, first weight compensating apparatus comprises an engaging device and the step of engaging comprises extending an actuator toward the glass ribbon from the engaging device and contacting the glass ribbon with a suction cup coupled to the actuator. The force applied by the weight compensating device may in some instances be greater than the free weight at a given time.

The method may further comprise engaging the glass ribbon with a second weight compensating apparatus. The second weight compensating apparatus need not apply a force that is the same magnitude as the first weight compensating device, but may apply a force to the glass ribbon that is different that the force applied by the first weight compensating apparatus.

In still another embodiment, an apparatus for producing a glass sheet is disclosed comprising a forming body for forming a glass ribbon from molten glass; a weight compensating apparatus for applying a force to the glass ribbon, the weight compensating apparatus comprising; a linear drive unit; a drive motor coupled to the linear drive unit; an engaging device coupled to the linear drive unit, the engaging device comprising a suction cup for contacting the glass ribbon; and wherein the weight compensating apparatus is configured to apply a downward force to the glass ribbon that is inversely proportional to a length of the glass ribbon. The engaging device may comprise an actuator configured to move the suction cup toward or away from the glass ribbon. In some embodiments the apparatus may comprise a plurality of weight compensating apparatus. The forming body preferably comprises a channel formed in an upper surface of the forming body for receiving molten glass, and converging forming surface that join at a root. Molten glass overflowing the channel walls flows over the converging forming surfaces as separate flows that rejoin or fuse at the root of the forming body.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and constitute a part of this specification. The drawings illustrate various embodiments of the invention and, together with the description, serve to explain the principles and operations of the invention.

DETAILED DESCRIPTION

Figure 1:
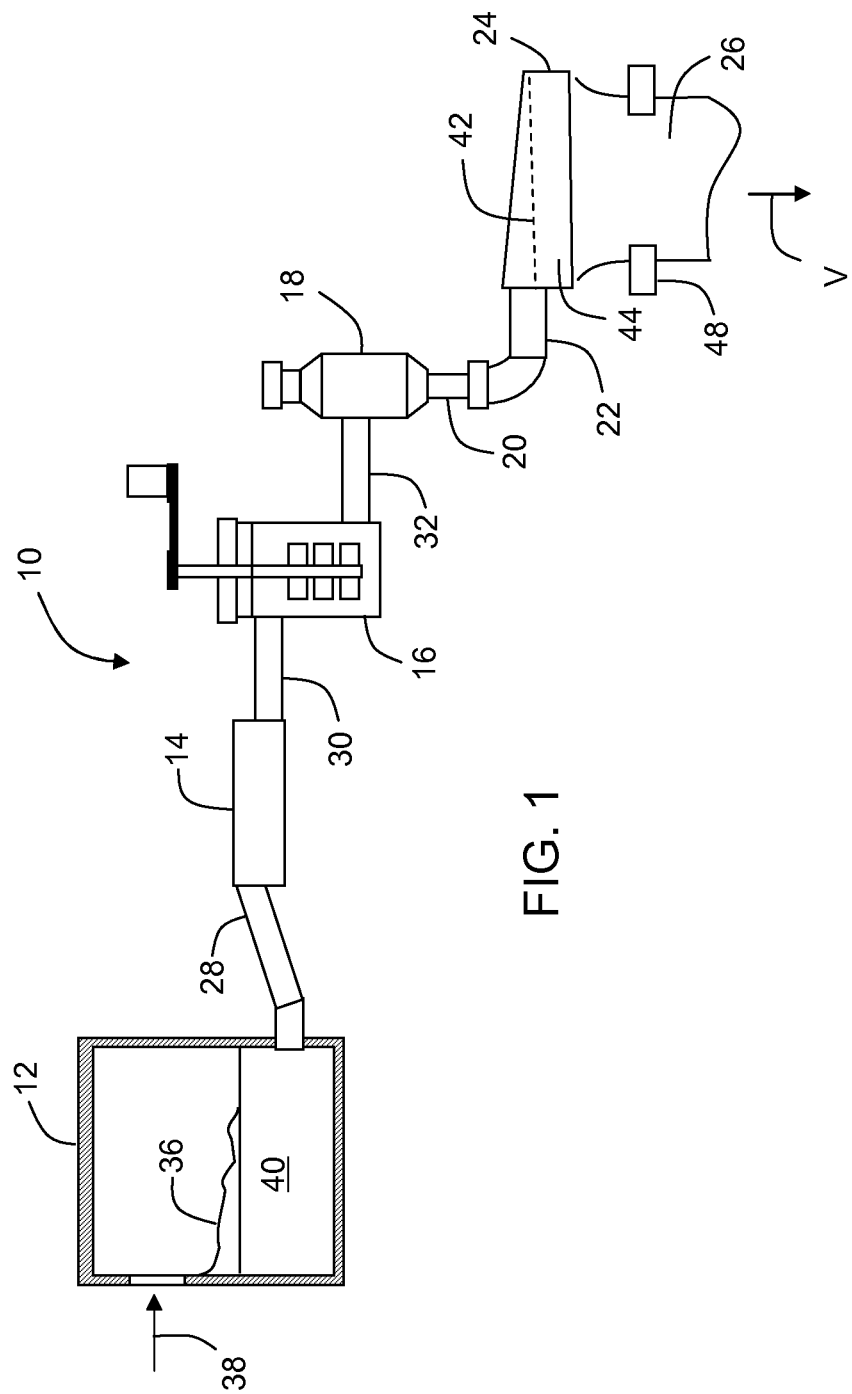
FIG. 1 is an elevational view of an exemplary glass making system.

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

FIG. 1 illustrates an exemplary embodiment of a fusion glass making system 10 for forming a glass sheet comprising melting furnace 12, fining vessel 14, stirring vessel 16, receiving vessel 18, downcomer 20, inlet 22 and forming body 24 from which a thin, continuously moving ribbon 26 of a molten glass-forming material descends. Glass making system 10 further comprises various other vessels or conduits for conveying the molten glass-forming material, including a melter-to-fining vessel connecting tube 28, a fining vessel-to-stirring vessel connecting tube 30, and a stirring vessel-to-receiving vessel connecting tube 32. While the melting furnace and forming body are typically formed from a ceramic material, such as ceramic bricks comprising alumina or zirconia, the various vessels and piping therebetween often comprise platinum or an alloy thereof. Although the following description relates to an exemplary fusion downdraw system and process, such as the system illustrated in FIG. 1, the present invention is equally applicable to other variations of downdraw glass making processes such as a single sided overflow process or a slot draw process, which processes are well known to those skilled in the art.

In accordance with the exemplary fusion process of FIG. 1, melting furnace 12 is provided with a batch material 36 that, as denoted by arrow 38, is charged into furnace 12 and melted by the furnace to produce a glass-forming material (hereinafter molten glass 40). Molten glass 40 is conveyed from melting furnace 12 to fining vessel 14 through melting furnace-to-fining vessel connecting tube 28. The molten glass is heated to a temperature in excess of the furnace temperature in fining vessel 14, whereupon multivalent oxide materials contained within the molten glass release oxygen that rises through the molten glass. This high-temperature release of oxygen aids in removing the small bubbles of gas within the molten glass generated by the melting of the batch material.

The molten glass then flows from fining vessel 14 through fining vessel-to-stirring vessel connecting tube 30 into the stirring vessel 16 where a rotating stirrer mixes and homogenizes the molten glass to ensure an even consistency. The homogenized molten glass from stirring vessel 16 then flows through stirring vessel-to-receiving vessel connecting tube 32, is collected in receiving vessel 18 and routed to forming body 24 through downcomer 20 and inlet 22 where the molten glass is formed into a glass ribbon.

Figure 2:
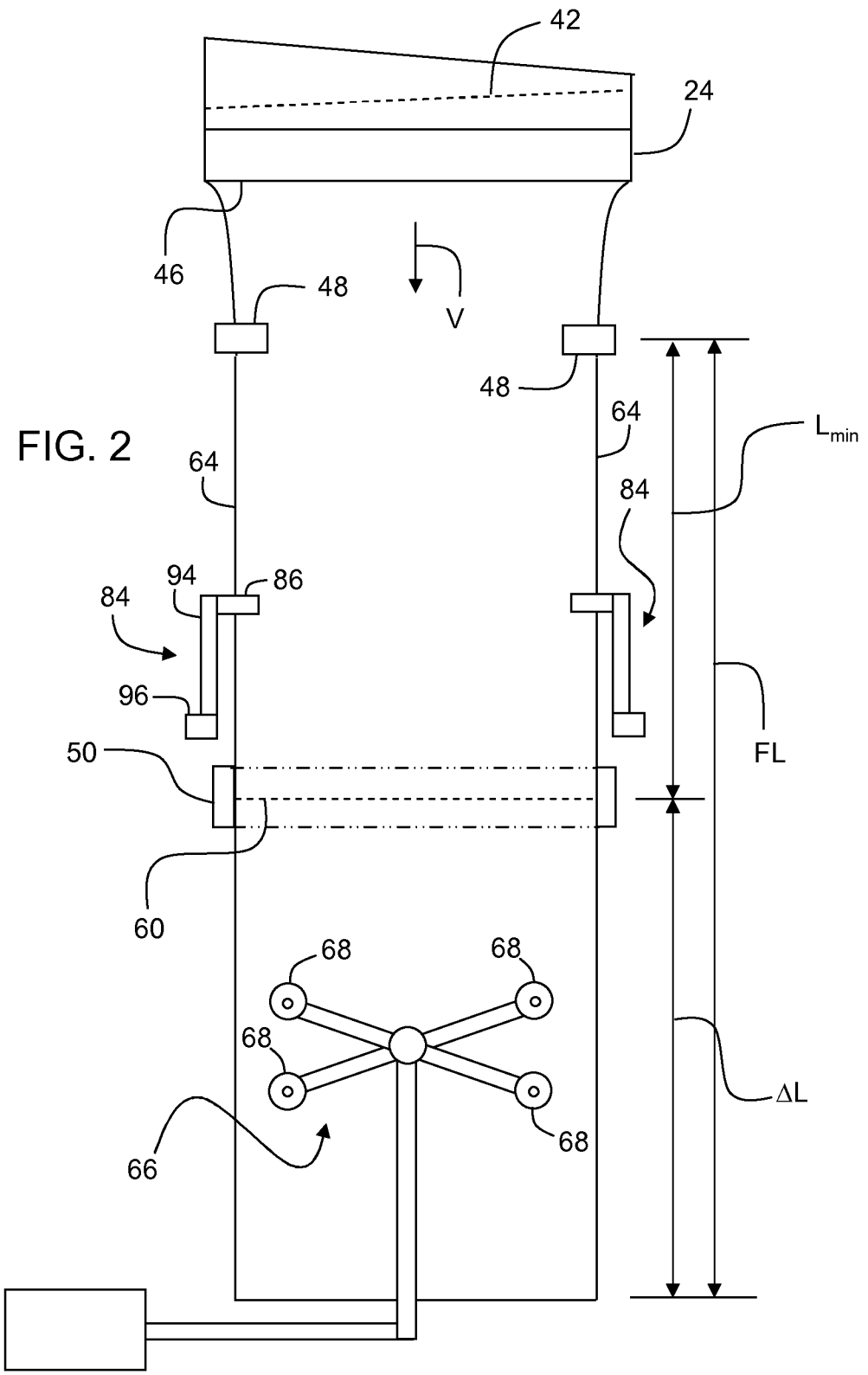
FIG. 2 is an elevational view of the glass making system of FIG. 1 showing components of the system downstream of the pulling rolls.

Forming body 24 comprises an open channel 42 positioned on an upper surface of the forming body and a pair of converging forming surfaces 44, best seen in FIG. 2, that converge at a bottom or root 46 of the forming body. The molten glass supplied to the forming body flows into the open channel and overflows the walls thereof, separating into two individual flows of molten glass that flow over the converging forming surfaces. When the separate flows of molten glass reach the root, they recombine, or fuse, to form a single glass ribbon 26 of viscous molten glass that descends from the root of the forming body. Glass ribbon 26 cools as it descends and passes through a glass transition temperature range where the glass ribbon undergoes a transformation from a viscous liquid to an elastic solid. Pulling rolls 48 arranged in opposing counter-rotating pairs contact and pinch the viscous glass ribbon along the edges of the ribbon and aid in drawing the ribbon in a downward direction. While pulling rolls 48 are driven, such as by suitable motors, additional driven or non-driven rolls may also contact the edges of the ribbon to aid both in guiding the ribbon and maintaining a width of the ribbon against naturally occurring surface tension effects that work to otherwise reduce the width of the ribbon.

To separate a glass sheet from the ribbon, a traveling anvil machine (TAM) 50 shown in FIG. 2 is employed. In a typical arrangement and as best viewed with the aid of FIG. 3, TAM 50 includes an anvil or backing bar 52 and a scoring device 54. Scoring device 54 may comprise, for example, a scoring wheel 56 such as that depicted in FIG. 3 that contacts glass ribbon 26 and applies a force against first major surface 58 of the glass ribbon across a width thereof, or a portion of the width, to produce a score line 60. As the name implies, anvil or backing bar 52 provides a counter force to the second major surface 62 of the ribbon (the side of the ribbon opposite the side on which the score line is made), thereby minimizing movement of the ribbon as the scoring wheel moves widthwise or laterally across the glass ribbon. Thus, in operation, the backing bar contacts the glass ribbon on a surface or side of the ribbon opposite the side of the ribbon on which the score is formed. During such time that a cutting operation is not occurring, scoring device 54 and backing bar 52 may be retracted away from the glass ribbon.

Because glass ribbon 26 is moving during the scoring process, TAM 50 moves with the glass ribbon to facilitate formation of score line 60 that is perpendicular to the edges 64 of the glass ribbon. That is, the ribbon is moving with a certain velocity vector V comprising a scalar magnitude (speed) dictated in part by the rotational speed of the pulling rolls, and a direction. It will be assumed for the purpose of further discussion that the direction of V is vertically downward, although in some embodiments, the direction may be different, such as by offsetting one or more sets of rolls.

To ensure no relative movement of TAM 50 and glass ribbon 26 during the scoring process, TAM 50 is configured to move with a speed and direction represented by velocity vector S that is the same or substantially the same as velocity vector V of the ribbon. Therefore, as scoring device 54 moves across the width of the ribbon, there is substantially no velocity difference between the downward movement of the ribbon and the downward movement of the TAM (and therefore the scoring wheel, or other scoring component) in the direction of travel of the glass ribbon. To wit, scoring device 54 is able to produce a score line transverse to the direction of ribbon travel.

When the score line is completed, robot 66 engages the portion of the ribbon downstream of the score line relative to the direction of travel of the ribbon with a plurality of suction cups 68, and applies a bending moment to the ribbon in a direction perpendicular to a major surface of the ribbon. Preferably, robot 66 contacts the glass ribbon on the same major surface that was contacted by backing bar 52, i.e. second major surface 62. The bending moment induced by robot 66 produces a tensile stress across score line 60 that causes a crack to form at the score line. The crack propagates through the thickness of the glass ribbon, thereby separating a glass sheet from the ribbon. Backing bar 52, and any additional contacting nosing bars that may be employed, are then disengaged from the glass ribbon and TAM 50 moves upstream to its starting position in preparation for another cutting cycle. In addition to the backing bar, TAM 50 may include one or more stabilizing bars (nosing bars) that contact the glass ribbon upstream, or downstream of the backing bar, either on the same side of the glass sheet as the backing bar (first major surface 58), or on the side of the glass sheet opposite the backing bar (second major surface 62) to further isolate movement below the backing bar or nosing bar from propagating upward to the viscous elastic zone of the glass ribbon. For the purpose of further discussion, the range of motion of the TAM during the cutting cycle in the direction of ribbon travel will be referred to as the TAM stroke. Accordingly, as arbitrarily chosen here, the cutting cycle begins just after a sheet of glass has been removed from glass ribbon 26 and TAM 50 has moved to the top of its stroke. It should be noted that the TAM stroke need not equate to the length of a glass sheet to be separated from the ribbon, but can be shorter than a glass sheet length.

At the beginning of a cutting cycle, the ribbon is at a minimum, or near-minimum length relative to root 46 of forming body 24, the removal of a glass sheet 70 (see FIGS. 6D and 6E) of a predetermined length having just occurred. Additionally, the weight of the glass ribbon relative to a given reference point, is also at a minimum. For example, if pulling rolls 48 are the lowest contact point between free end 72 of glass ribbon 26 and that contact point, the weight of the glass ribbon over that length of ribbon is at a minimum. There may be additional rolls positioned lower than the pulling rolls that may support a weight of the ribbon, so the use of the pulling rolls as a reference point is arbitrary and used herein for the purpose of illustration, not limitation. Indeed, a length of the ribbon may be in respect of any arbitrary reference point, such as the root of the forming body. It is sufficient to say that at some point along the length of glass ribbon 26 between and including root 46 of forming body 24 and free end 72 of the continuously moving glass ribbon there is a structure that contacts the glass ribbon, and may support the weight, or a portion of the weight, of the ribbon, and the distance between that structure and the free end of the glass ribbon represents a weight based on the density of the glass forming the glass ribbon and the dimensions of the glass ribbon. Because the glass ribbon is continuously being renewed from the forming body, and is therefore continuously moving downward, the length of the glass ribbon below the selected reference point and terminating at the free end of the glass ribbon, hereafter the "free length" (FL) of the ribbon, is continuously increasing during intervals of cutting. And with an increasing free length there is a continuously increasing weight associated with the free length, hereinafter the "free weight" (FW). That is, the free length and the free weight at the beginning of a cutting cycle are at a minimum, and increase substantially steadily until a glass sheet is separated from the glass ribbon, at which point the free length and free weight return to the minimum for each. At the point just prior to the separation of the glass sheet from the continuously moving glass ribbon, the free length and the free weight are at a maximum (for the purpose of discussion, any load, or weight assumed by the robot in contact with the free length of the ribbon is not considered). The free length is at a minimum at the moment a glass sheet is separated from the ribbon, and at a maximum the moment before a glass sheet is separated from the ribbon. Thus, the free length FL can be represented by $L_{min}+\Delta L$, where $L_{min}$ is a minimum length of the free length and $\Delta L$ represents the variation in the free length, which is also the length of the glass sheet to be separated from the glass ribbon. Similarly, the free weight FW is represented by $W_{min}+\Delta W$ where $W_{min}$ is a minimum weight of the free length and $\Delta W$ represents the variation in the free weight, which is also the weight of the glass sheet to be separated from the glass ribbon. Accordingly, $\Delta W_{max}$ and $\Delta L_{max}$ denote the maximum change in free weight $\Delta W$ and the maximum change in free length $\Delta L$, respectively.

Figure 4:
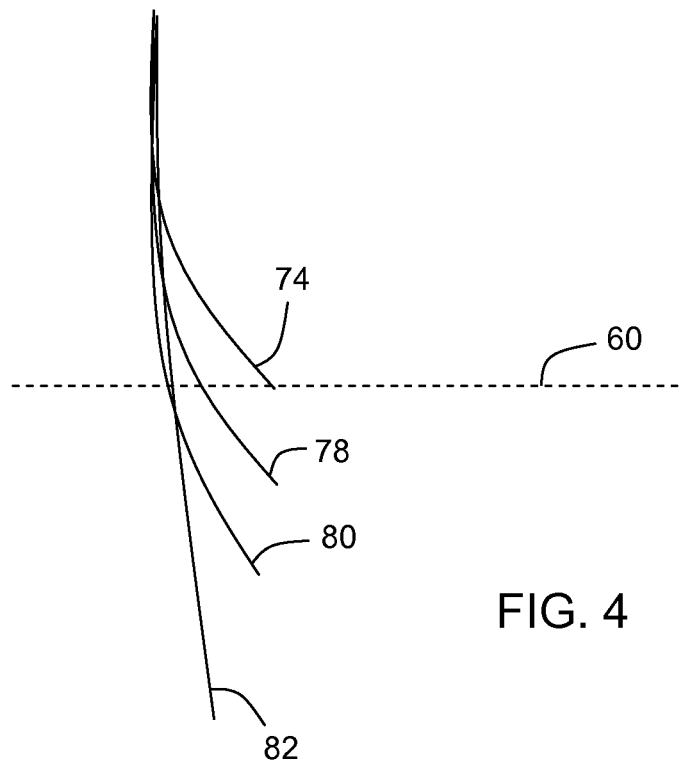
FIG. 4 shows an edge view of various longitudinal shapes of a continuously moving glass ribbon as the glass ribbon length increases.

As the free length and free weight increase, the shape of the glass ribbon is constantly changing. For example, the glass ribbon may exhibit a bow or curl. As the free weight increases, there is a tendency for the ribbon to flatten, at least longitudinally along a length of the glass ribbon, as a result of increase in free weight. That is, as the ribbon descends from the forming body, it may exhibit many complex shapes, either along a length of the ribbon, across a width of the ribbon, or a combination thereof such that the ribbon has a non-planar overall shape. The steadily increasing free weight has a tendency to reduce the non-planar shape of the ribbon along at least a length of the ribbon. However, the free length of the ribbon, being in an elastic portion of the ribbon, holds a particular longitudinal shape as a consequence of the free weight. When the free weight is suddenly removed, the glass ribbon will assume the shape it would have had without the free length. This can be more easily seen with the aid of FIG. 4, which illustrates a longitudinal shape of the glass ribbon as seen from an edge of the ribbon during various stages of a single cutting cycle. In accordance with FIG. 4, curve 74 represents a shape of the glass ribbon at the start of a cutting cycle: the free length FL and free weight FW are at a minimum ($\Delta L$ and $\Delta W$ are equal to zero). The dashed line represents the position of score line 60. As the free length FL and the free weight FW increase, the ribbon begins to flatten, as depicted by curves 78 and 80, respectively. Finally, just before the glass sheet is separated at score line 60, the free length and free weight are at a maximum represented by curve 82 and the glass ribbon is at its flattest. However, because at least a portion of the free length is within an elastic region of the ribbon, there is significant energy stored in the free length when the free length is at a maximum and weighted down by the free weight. When glass sheet 70 is removed (that portion of the ribbon between score line 60 and free end 72 of the glass ribbon), the potential energy in the glass ribbon is released and the ribbon springs back to the position of curve 74. As noted, this sudden shape change can cause upstream disruption to the drawing process.

Figure 3:
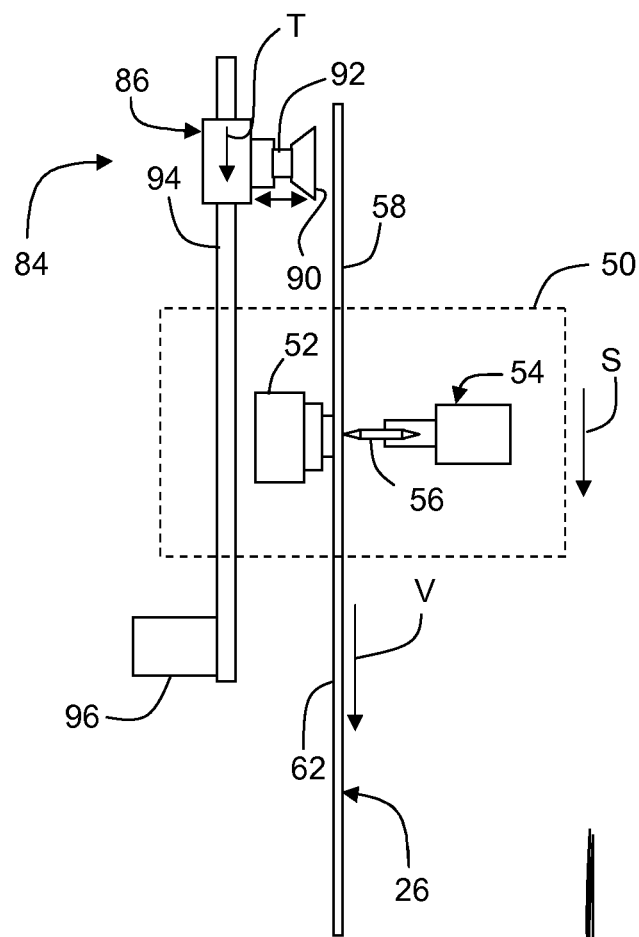
FIG. 3 is a front view of a traveling anvil machine and a weight compensating apparatus according to an embodiment of the present invention.

Accordingly, FIG. 3 further illustrates a weight compensating apparatus 84 that compensates for the varying free weight, thereby stabilizing a shape of the continuously moving glass ribbon. Weight compensating apparatus 84 comprises an engaging device 86 that contacts and engages with glass ribbon 26, and a conveyor 88 along which engaging device 86 travels with a velocity vector U that is the same or substantially the same as the velocity vector V of the continuously moving glass ribbon. It is noted that velocity vector U is shown in the downward direction only. When the direction of engaging device 86 is reversed so that engaging device is moving upward, the speed at which the upward movement occurs can be considerably faster than the scalar speed comprising velocity vector U. Also, as noted herein below, engaging device 86 may be moved at a speed somewhat different than the speed component of velocity vector V as a way of developing a downward force on ribbon 26 when engaged with the ribbon. This velocity differential will vary as the free weight of the ribbon varies. While the following description is directed to a single weight compensating device, multiple weight compensating devices may be used. For example, two weight compensating devices may be used to apply a load to each side edge portion of the glass ribbon.

Engaging device 86 may include, for example, a suction cup 90 formed from a resilient material much softer than the glass of the glass ribbon so that minimal damage may be incurred from contact between the suction cup and the glass ribbon. Suction cup 90 may be coupled to actuator 92 configured to extend or retract the suction cup toward or away from a major surface of the glass ribbon, respectively. Actuator 92 may comprise, for example, a pneumatic cylinder in fluid communication with a source of pressurized air (not shown). Alternatively, actuator 92 may comprise a hydraulic cylinder or an electrical solenoid.

Suction cup 90 is connected with a vacuum source (not shown) so that a vacuum is supplied to the suction cup and the suction cup grips the glass ribbon when the suction cup is brought into contact with the glass ribbon. Preferably, suction cup 90 contacts the glass ribbon at the edges of the ribbon, outside the quality area, since the edges of the glass ribbon are later removed.

Engaging device 86 preferably also includes a load cell (not shown) that measures a torque $T_q$ between the glass ribbon and the engaging device.

Engaging device 86 is coupled to conveyor 88. Conveyor 88 comprises a rail or linear drive unit 94 and drive motor 96. Drive motor 96 may be, for example, a servomotor. Drive motor 96 is coupled to linear drive unit 94 and together they provide motion and torque control to engaging device 86 as instructed by control unit 98 (See FIG. 5). Control unit 98 may be a computing device, such as a general purpose computer or other information processing device, that receives process inputs from the drawing equipment and sends out a control signal that varies a drive speed of linear drive unit 94 via drive motor 96.

Figure 5:
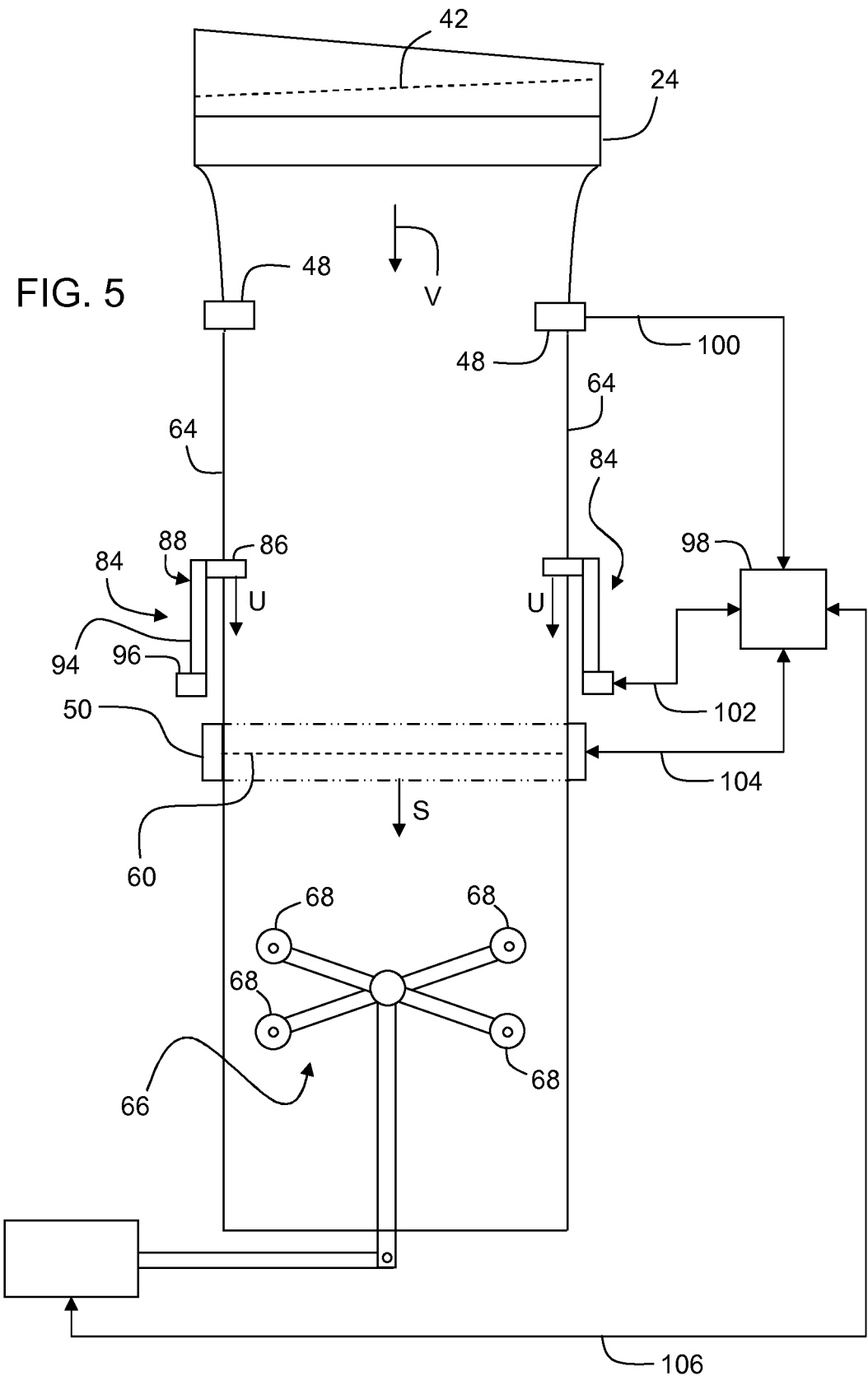
FIG. 5 is a front view of the apparatus of FIG. 2 showing components for controlling movement of and force applied by the weight compensating apparatus of FIG. 3.

As illustrated in the diagram of FIG. 5, control unit 98 may be configured to receive a rotational speed of the pulling rolls (or alternatively a rotational speed of one or more other rolls in contact with the continuously moving glass ribbon) obtained from, for example, an encoder incorporated into the pulling rolls and provided to control unit 98 through control line 100. Control unit 98 can then calculate a linear speed of the continuously moving ribbon from the rotation speed of the pulling rolls. However, other methods of obtaining a linear speed of the glass ribbon as are known in the art may be employed.

Control unit 98 may be configured to determine a rate of free weight increase based on the linear speed of the glass ribbon. This can be determined, for example, based on the glass density, which is known for a known glass composition, and the dimensions of the glass ribbon width and free length. Thus, control unit 98 can calculate a rate of change of the free weight and accordingly calculate the drive torque to be applied to linear drive unit 94 and therefore the downward force F applied by weight compensating apparatus on the glass ribbon so as to emulate the maximum free weight. That is, control unit 98 may be configured via process inputs and internal software to provide a signal to weight compensating apparatus 84 through control line 102 to apply a downward force on the glass ribbon that emulates the force derived from the maximum free weight. This downward force F can be applied, for example, by moving engaging device 86, coupled to conveyor 88, at a speed somewhat greater than the speed component of ribbon velocity V. When the free weight is at a minimum, weight compensating apparatus 84 applies a downward force on the glass ribbon based on a predetermined length for a glass sheet so that the ribbon behaves (i.e. assumes a shape) as it would if the maximum free length (and therefore free weight) was present. As the free length of the continuously moving glass ribbon increases, the downward force applied to the glass ribbon by weight compensating apparatus 84 decreases proportionally. When the free weight is at a maximum, the force applied by the weight compensating apparatus is at a minimum. Accordingly, the combination of the instantaneous free weight, and the instantaneous value of force F combine so that the shape of the glass ribbon remains substantially constant through the cutting cycle.

In some embodiments, pulling rolls (or other rolls in contact with the glass ribbon) may be configured to supply a torque value to control unit 98. For example, the torque $T_q$ developed at the pulling rolls can be used to determine an actual present (instantaneous) weight of the ribbon rather than a weight based on a calculated length (itself based on a speed of the ribbon). Moreover, control unit 98 may be used to control the operation of TAM 50 through control line 104 and robot 66 through control line 106.

Referring to FIGS. 6A-6F, operation of weight compensating apparatus 84 will now be described through a full cutting cycle beginning arbitrarily at a point where a glass sheet has just been removed from the continuously moving glass ribbon and the TAM and weight compensating apparatuses are at their respective initial positions. For the purpose of describing the operation of the TAM and the weight compensating apparatus, the position of TAM 50 at the beginning of a cut cycle will be referred to as start position 108, which is the upper-most upstream position of TAM 50 at the top of the TAM stroke; the position of engaging device 86 will be referred to as home position 110, which is the upper-most upstream position of the engaging device. In respect of timing, the time at the start of the cut cycle will be arbitrarily denoted as $t_1$.

For the purpose of discussion, return travel times of TAM 50 and engaging device 86 will be considered negligible. In practice, allowance would be made for finite return travel times. That is, for example, while the TAM takes a finite amount of time to travel over the device's entire stroke during a return motion, for the purposes of discussion, this return travel time, and inertia (affecting time to come to full speed) will be considered negligible.

Figure 6A:
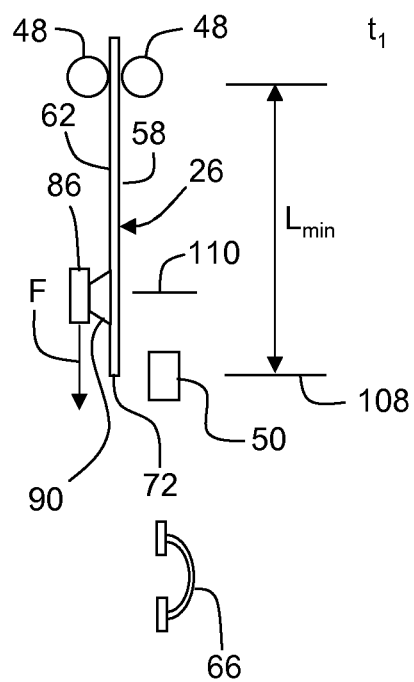
FIG. 6A-6F illustrate stages of an exemplary glass ribbon cutting cycle as viewed from an edge of the glass ribbon.

Beginning at $t_1$ and referring to FIGS. 5 and 6A, engaging device 86 of weight compensating apparatus 84 is engaged with glass ribbon 26, and is traveling downward with velocity vector U substantially equal to velocity vector V of glass ribbon 26. To wit, actuator 92 is activated, extending suction cup 90 toward glass ribbon 26. A vacuum is applied to suction cup 90. When suction cup 90 contacts glass ribbon 26, suction cup 90 engages with glass ribbon 26 so that a downward force F can be applied to the glass ribbon without suction cup 90 losing contact or changing position (slipping). Drive motor 96, controlled by control unit 98, moves engaging device 86 downward via linear drive unit 94. Simultaneously, a load cell incorporated into engaging device 86 senses the torque $T_q$ experienced by the engaging device and provides the magnitude of the torque to control unit 98 through control line 102. The torque $T_q$ is converted to an equivalent downward force F by control unit 98, which thereafter controls drive motor 96 so that downward force F applied by the engaging device equals a predetermined value, e.g. ΔW. Preferably, downward force F at $t_1$ where the free length is at a minimum is the same, or nearly the same as $\Delta W_{max}$. In other words, the purpose of weight compensating apparatus 84 being to compensate for variations in the free weight (i.e. ΔW), the weight compensator applies a maximum force when ΔL=0 and a minimum force at $\Delta L_{max}$. In a preferred embodiment $\Delta W_{max}$ is the weight of the glass sheet to be removed from the glass ribbon. That is, since the length of the glass ribbon is predetermined by the process (e.g. a customer specification), the weight of that glass sheet is predetermined and known or at least well-estimated. However, $\Delta W_{max}$ can be more than or in some cases less than the predetermined weight of the glass sheet to be removed. This may occur, for example, when the process is changed to produce a glass sheet having a different length than a previous glass sheet, but the load applied by the weight compensating apparatus is not changed. As the continuously moving glass ribbon moves downward, the free length, and therefore ΔW, increases and control unit 98 controls drive motor 96 so that the load applied by engaging device 86 is proportionally decreased. Additionally, while TAM 50 is illustrated as being arranged opposite a single side of glass ribbon 26, in practice, TAM 50, or portions thereof, may be arranged on both sides of the glass ribbon. This may be self evident, since the scoring takes place on one side of the glass ribbon, while the backing bar is arranged opposite the scoring device.

Figure 6B:
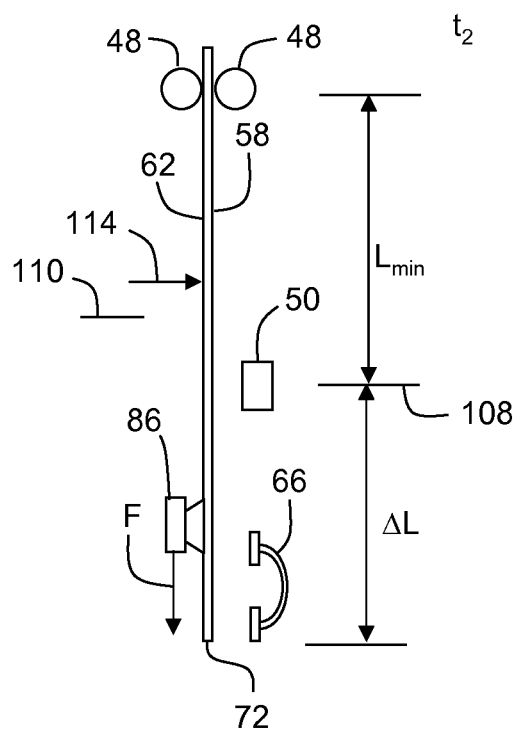

Beginning at $t_2$ as shown in FIG. 6B and referencing FIG. 5 also, the glass ribbon free length continues to grow by ΔL and score line position 114 nears the position of TAM 50. When a sufficient length of glass ribbon has passed TAM 50 that TAM 50 is adjacent the intended score line position 114, TAM 50 engages with glass ribbon 26. Position 116 represents a subsequent (future) scoring position to produce the next glass sheet.

Figure 6C:
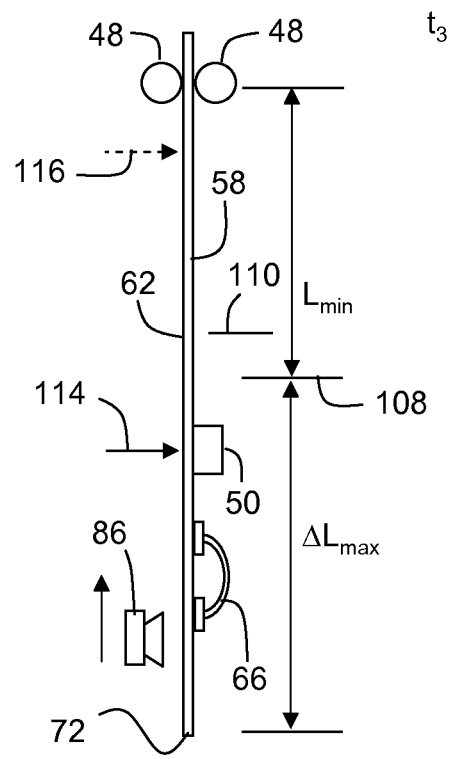

Beginning at time $t_3$ as depicted in FIG. 6C and referring also to FIG. 5, when free end 72 has reached a predetermined position where the free length, and therefore the free weight has reached a maximum ($\Delta L = \Delta L_{max}$, $\Delta W = \Delta W_{max}$), and the load applied by weight compensating apparatus 84 has reached a minimum (F is minimized), engaging device 86 is disengaged from glass ribbon 26 and returned to home position 110. Robot 66 engages with glass ribbon 26 and scoring device 54 begins scoring across a width of the glass ribbon, producing score line 60. Robot 66 engages with glass ribbon 26 below score line 60.

Figure 6D:
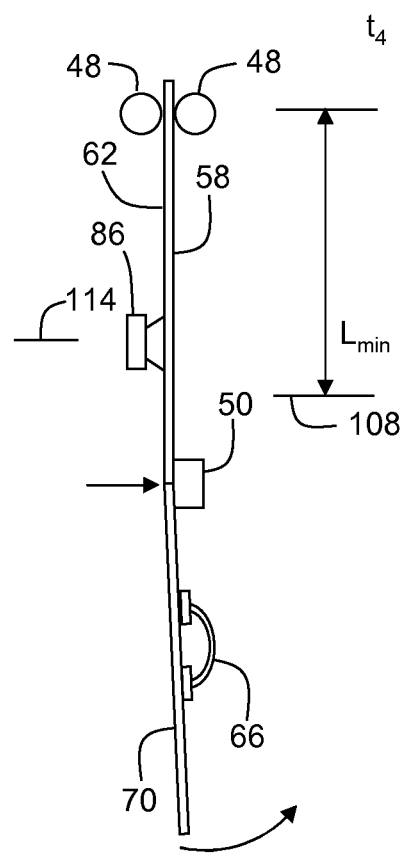

As shown by FIG. 6D and beginning at time $t_4$, robot 66 applies a bending force across score line 60. The bending force is manifest as a tensile stress that creates a crack at the score line that propagates through and across the glass ribbon.

Figure 6E:
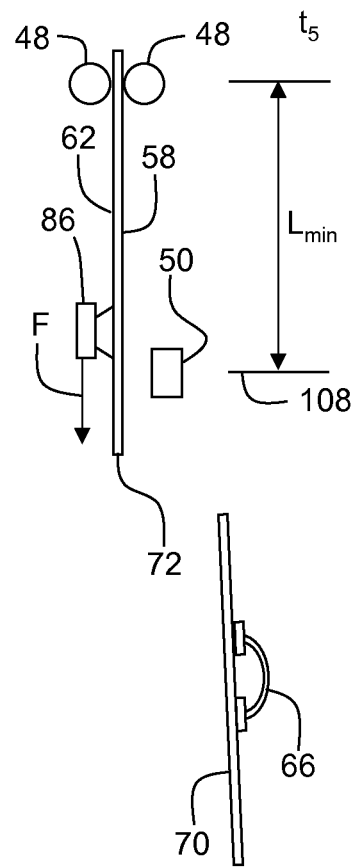

Referring now to FIG. 6E and beginning at time $t_5$, engaging device 86 is engaged with glass ribbon 26 and traveling with velocity vector U that is the same or substantially the same as velocity vector V of the glass ribbon 26. Meanwhile, robot 66, removes the separated glass sheet 70.

Figure 6F:
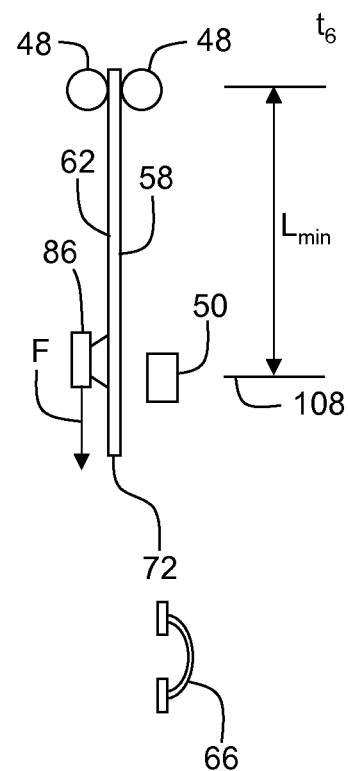

Finally, at $t_6$ and as shown in FIG. 6F, TAM 50 disengages from glass ribbon 26 and moves back to start position 108 and engaging device 86 is supplying a maximum downward force F.

One skilled in the art will understand based on the present disclosure that the foregoing sequence and timing of events may be modified as needed for a particular glass drawing equipment and operation, and that the preceding sequence was merely a description of an exemplary sequence.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method of forming a glass sheet comprising:
    a) flowing molten glass from a forming body in a downdraw process to form a continuously moving glass ribbon having a free length and a free end, and wherein the free length of the glass ribbon is defined as the length of the glass ribbon from the lowest contact point between the glass ribbon and a structure supporting a weight of the glass ribbon to the free end of the glass ribbon, and where the free length varies as a function of time;
    b) engaging the continuously moving glass ribbon along the free length with a first weight compensating apparatus, the first weight compensating apparatus comprising an engaging device that contacts and engages the continuously moving glass ribbon and a conveyor, the engaging device traveling along the conveyor in a downdraw direction of the continuously moving glass ribbon;
    c) applying a first downward force to the continuously moving glass ribbon with the first weight compensating apparatus, wherein the first downward force applied by the first weight compensating apparatus is inversely proportional in magnitude to the free length of the glass ribbon such that as the free length of the continuously moving glass ribbon increases, the force applied by the weight compensating apparatus decreases;
    d) forming a score in the continuously moving glass ribbon; and
    e) separating a portion of the continuously moving glass ribbon at the score to form a glass sheet.

2. The method according to claim 1, further comprising repeating steps b) through d) to form a subsequent glass sheet.

3. The method according to claim 1, further comprising engaging the continuously moving glass ribbon with a traveling anvil machine.

4. The method according to claim 3, wherein the traveling anvil machine does not apply a downward force to the continuously moving glass ribbon.

5. The method according to claim 1, further comprising engaging the continuously moving glass ribbon with a robot below the score.

6. The method according to claim 1, wherein the first weight compensating apparatus is engaged with a first edge portion of the free length.

7. The method according to claim 1, further comprising engaging a second edge portion of the free length with a second weight compensating apparatus.

8. The method according to claim 7, wherein the second weight compensating apparatus is controlled independently from the first weight compensating apparatus.

9. The method according to claim 8, wherein the first force applied to the continuously moving glass ribbon by the first weight compensating apparatus varies from a second force applied to the continuously moving glass ribbon by the second weight compensating apparatus.

10. The method according to claim 1, wherein the structure supporting the free length of the glass ribbon comprises rollers.

11. A method of forming a glass sheet comprising
    a) flowing molten glass from a forming body in a downdraw process to form a continuously moving glass ribbon having a free end, the glass ribbon traveling with a velocity vector V and comprising a time varying free weight;
    b) engaging the glass ribbon with rollers;
    c) engaging the glass ribbon below a lowest roller engaged with the glass ribbon with a first weight compensating apparatus, the first weight compensating apparatus comprising an engaging device that contacts and engages the glass ribbon and a conveyor, the engaging device traveling along the conveyor in a downdraw direction of the glass ribbon, wherein the first weight compensating apparatus applies a first force to the glass ribbon that is inversely proportional in magnitude to the variation in free weight;
    d) scoring the glass ribbon; and
    e) separating a glass sheet from the glass ribbon.

12. The method according to claim 11, wherein step e) comprises applying a bending force to the glass ribbon with a robot engaged with the glass ribbon.

13. The method according to claim 11, further comprising engaging the glass ribbon with a backing bar, the backing bar traveling at a velocity vector that equals the velocity vector V of the glass ribbon.

14. The method according to claim 11, wherein the first weight compensating apparatus comprises an engaging device and the engaging below the lowest roller comprises extending an actuator toward the glass ribbon from the engaging device and contacting the glass ribbon with a suction cup coupled to the actuator.

15. The method according to claim 11, wherein the force applied by the weight compensating device is greater than the free weight at a predetermined time.

16. The method according to claim 11, further comprising engaging the glass ribbon below the lowest rollers engaged with the glass ribbon with a second weight compensating apparatus.

17. The method according to claim 16, wherein the second weight compensating apparatus applies a force to the glass ribbon that is different than the force applied by the first weight compensating apparatus.

18. A method of forming a glass sheet comprising:
    a) flowing molten glass from a forming body in a downdraw process to form a continuously moving glass ribbon;
    b) engaging the glass ribbon with rollers, the glass ribbon comprising a free end disposed below the rollers and a free length disposed between the rollers and the free end, and wherein a weight of the free length varies as a function of time;
    b) engaging the free length with a first weight compensating apparatus, the first weight compensating apparatus comprising an engaging device that contacts and engages the glass ribbon and a conveyor, the engaging device traveling along the conveyor in a downdraw direction of the glass ribbon;
    c) applying a first downward force to the free length with the first weight compensating apparatus, wherein the first downward force applied by the first weight compensating apparatus is inversely proportional in magnitude to the free weight of the glass ribbon such that as the free weight of the continuously moving glass ribbon increases, the force applied by the weight compensating apparatus decreases;

c) forming a score in the continuously moving glass ribbon; and d) separating a portion of the continuously moving glass ribbon at the score to form a glass sheet.

19. The method according to claim 18, wherein engaging the free length comprises extending an actuator from the first weight compensating device toward the glass ribbon and contacting the free length with a suction cup coupled to the actuator.

20. The method according to claim 18, further comprising engaging the free length with a second weight compensating apparatus.

* * * * *